United States Patent
Baliga et al.

(10) Patent No.: US 7,900,046 B2
(45) Date of Patent: Mar. 1, 2011

(54) SYSTEM AND METHOD FOR ESTABLISHING MUTUAL TRUST ON A PER-DEPLOYMENT BASIS BETWEEN TWO SOFTWARE MODULES

(75) Inventors: Priya Baliga, San Jose, CA (US); Randy M. Nakagawa, San Jose, CA (US); Tian Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 11/331,334

(22) Filed: Jan. 11, 2006

(65) Prior Publication Data

US 2007/0162752 A1  Jul. 12, 2007

(51) Int. Cl.
*H04L 9/00* (2006.01)
*G06F 7/04* (2006.01)

(52) U.S. Cl. ......... 713/169; 713/155; 713/156; 713/157; 713/158; 713/159; 726/3; 726/4; 726/5; 726/6; 726/7

(58) Field of Classification Search .................... 713/169
See application file for complete search history.

(56) References Cited

U.S. PATENT DOCUMENTS

| | | | |
|---|---|---|---|
| 5,619,657 A | 4/1997 | Sudama | 395/999.999 |
| 5,629,980 A * | 5/1997 | Stefik et al. | 705/54 |
| 6,615,350 B1 * | 9/2003 | Schell et al. | 713/168 |
| 2005/0154875 A1 | 7/2005 | Chao | 713/156 |
| 2005/0262345 A1 * | 11/2005 | Moreau | 713/173 |
| 2006/0007466 A1 * | 1/2006 | Ben-Yehuda et al. | 358/1.13 |

FOREIGN PATENT DOCUMENTS

| | | |
|---|---|---|
| EP | 1 227 386 A1 | 7/2002 |
| EP | 1 533 706 A1 | 5/2005 |
| WO | WO 02/21253 A2 | 3/2002 |

OTHER PUBLICATIONS

European Patent Office, PCT International Search Report, application PCT/EP2007/050071, mailed Mar. 16, 2007.
Bolosky, W. J. et al. *Feasibility of a Serverless Distributed File System Deployed on an Existing Set of Desktop PCs* ACM Performance Evaluation Review Conference vol. 28 Issue 1, Jun. 2000, p. 34-43.
Keun-Ho Lee, Heyi-Sook Suh, Sang-Bum Han, Sang Keun Lee, and Chong-Sun Hwang. "An Authentication Protocol Based on CBRP in Ad Hoc Network", *6th International Conference on Advanced Communication,*, IEEE, Piscataway, NJ. vol. 1, p. 407-412. Publication date 2004.

(Continued)

*Primary Examiner* — Longbit Chai
(74) *Attorney, Agent, or Firm* — David W. Victor; Konrad Raynes & Victor LLP

(57) ABSTRACT

A system, method, and computer program product for establishing mutual trust on a per-deployment basis between two software modules. For example, the first software module may be a Websphere (WS) Information Integrator (II) deployment instance, and the second software module may be a plugin instance. By executing for this deployment an initial handshake between the software modules, both modules identify themselves and exchange digital certificates received from a trusted certification authority and respective public keys. Subsequent communications for this deployment between the software modules proceed with each module encrypting its communications with the public key of the other module; thereby establishing mutual trust between the software modules for each deployment.

26 Claims, 7 Drawing Sheets

OTHER PUBLICATIONS

Webopedia Computer Dictionary: LDAP. Dec. 9, 2005. [Accessed at http://www.webopedia.com/TERM/LDAP.html].

Sun Microsystems, "Code Samples and Apps: Applets". 1 page. [Accessed Apr. 19, 2006 at http://java.sun.com/applets/].

Sun Microsystems, "Lesson: Packaging Programs in JAR Files". 2 pages. [Accessed Apr. 19, 2006 at http://java.sun.com/docs/books/tutorial/deployment/jar/].

Monica Pawlan and Satya Dodda. "Signed Applets, Browsers, and File Acess", Sun Microsystems, Apr. 1998, 5 pages. [Accessed Apr. 19, 2006 at http://java.sun.com/developer/technicalArtciles/Security/Signed/].

Microsoft Corporation. "Designing Secure ActiveX Controls". (c) 2006, 3 pages. [Accessed Apr. 19, 2006 at http://msdn.microsoft.com/workshop/components/activex/security.asp?frame=true].

Microsoft Corporation. "Introduction to ActiveX Controls". (c) 2006, 9 pages. [Accessed Apr. 19, 2006 at http://msdn.microsoft.com/workshop/components/activex/intro.asp?frame=true].

* cited by examiner

OPEN SYSTEMS INTERCONNECTION (OSI)

SYSTEM AND METHOD FOR ESTABLISHING MUTUAL TRUST ON A PER-DEPLOYMENT BASIS BETWEEN TWO SOFTWARE MODULES

BACKGROUND OF THE INVENTION

1. Technical Field of the Invention

This invention relates to computer programming. More particularly, it relates to establishing trust between software entities on a per-deployment basis.

2. Background Art

Websphere (WS) Information Integrator (II), an example of a pluggable architecture, provides an open pluggable architecture for obtaining identity mapping information for different systems involved in an integration project. This architecture allows both industry-standard integration components as well as proprietary elements to be integrated or plugged into WS II through a simple interface. The software components that can be plugged into WS II and work together with WS II are called Plugins.

The Lightweight Directory Access Protocol (LDAP) is an Internet protocol that other programs use to look up information from a server. It is protocol for accessing information directories. LDAP is based on the standards contained within the X.500 standard, but is significantly simpler. And unlike X.500, LDAP supports TCP/IP, which is necessary for any type of Internet access. Because it's a simpler version of X.500, LDAP is sometimes called X.500-lite. LDAP should eventually make it possible for almost any application running on virtually any computer platform to obtain directory information, such as email addresses and public keys. Because LDAP is an open protocol, applications need not worry about the type of server hosting the directory.

LDAP servers index all the data in their entries, and "filters" may be used to select just the person or group desired, and return just the information desired. LDAP is used to look up encryption certificates, pointers to printers and other services on a network, and provide "single sign-on" where one password for a user is shared between many services. LDAP is appropriate for directory-like information, where fast lookups and less-frequent updates are the norm. LDAP also defines: (1) Permissions, set by the administrator to allow only certain people to access the LDAP database, and optionally keep certain data private, and (2) Schema, to describe the format and attributes of data in the server.

A plugin contains the logic to retrieve secured information from a LDAP server and then decrypt the secured information for WS II to use. A plugin is associated with a WS II instance, or deployment, and not associated with each user. This is an example of a situation where there is a need to build mutual trust between two software entities—in this example, WS II instance and a plugin invocation. Thus, there is a need not previously recognized or resolved by the art to establish mutual trust between the two software entities.

A further complication arises due to the fact that WS II trial versions can be freely downloaded off the web. Not only must the plugin know that it is talking to a WS II instance, but it needs to know that it is interacting with a specific customer-authorized deployment of WS II. Otherwise, a malicious user may install a trial version of WS II and try to get the plugin to divulge usernames and passwords to it. Therefore, there is a need not previously recognized or resolved by the art to establish mutual trust between the two software entities on a per-deployment basis, that is, with each deployment of WS II.

Applets run in a user's context (such as a browser or AppletViewer). They could be malicious, spreading viruses and so forth. The Java Virtual Machine (JVM) attempts to circumvent this problem by restricting the ability of applets to function. For example, unsigned applets are not permitted to read and write files, load libraries on a client, execute processes, exit the virtual machine, open network connections except to the host. Further, applets loaded over the net are passed through a verifier to ensure that bytecodes were not engineered. The trust issue in applets has heretofore required that applets be restricted to run in a closed sandbox thereby significantly curbing their abilities. Thus there is a need not previously recognized and resolved by the art for a trust mechanism that allows Plugins various privileges, including executing decryption logic embedded within it.

In Java, the problem of applets being too restrictive has heretofore been approached by allowing applets to be signed. A signed applet is one that is packaged within a signed jar file. The signed jar file can be downloaded from an HTTP server, just like any other jar file. However, for the applet to be trusted, the user must trust the key that was used to sign the jar file. When a signed applet is encountered, a security dialog pops up, identifying the signer of the jar. The user is given an option to either grant always, grant this session, deny, or provide more information to the applet. Once the user makes a selection, the applet will then run in the corresponding security context. However, this technique requires user intervention at least once, and it only establishes one-way trust. Mutual trust is not realized inasmuch as the signed applet is usable by anyone who can download it.

As a result, since applets are too restrictive, they are seldom useful. To allow more useful mobile code, ActiveX controls are used. These can be downloaded onto browsers or placed in a plugin directory. Since ActiveX controls do not run in a sandbox, they can run any commands on the user's system. The introduction of such controls spawned a variety of viruses on the Net. Consequently, validation of ActiveX is done by "code signing", by which developers certify that their software modules are not harmful and pay a nominal fee to an agency for the privilege of obtaining a digital certificate. When an Activex control is downloaded to a browser, the browser checks to make sure there is a valid signature that has not been altered and that the developer is in good standing with the signature authority. Only then can the control be usable. While this approach is a solution to one-way trust, the ActiveX control is still unable to verify the authenticity of the caller.

Other approaches to trustworthiness include Microsoft Authenticode™ technology which lets end users who publish a software component verify that it was not changed since it was signed and downloaded. Although Authenticode technology provides some assurance of code identity and integrity, it does not establish mutual trust on a per deployment basis.

Thus, there is a need in the art for a system and method for establishing mutual trust between two software components on a per-deployment basis.

SUMMARY OF THE INVENTION

A system, method, and computer program product for establishing mutual trust on a per-deployment basis between two software, by executing for this deployment an initial handshake between the software modules wherein both modules identify themselves and exchange digital certificates received from a trusted certification authority and respective public keys; and executing subsequent communications for this deployment between the software modules with each module encrypting its communications with the public key of the other module; thereby establishing mutual trust between the software modules for each deployment.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

In accordance with the preferred embodiment of the invention, there is provided a system and method for assuring mutual trust between software components on a per-deployment basis. Thus, for example, when WS II and Plugin components are dynamically hooked together, mutual trust is established between these two parties as will be described hereafter.

Figure 1:
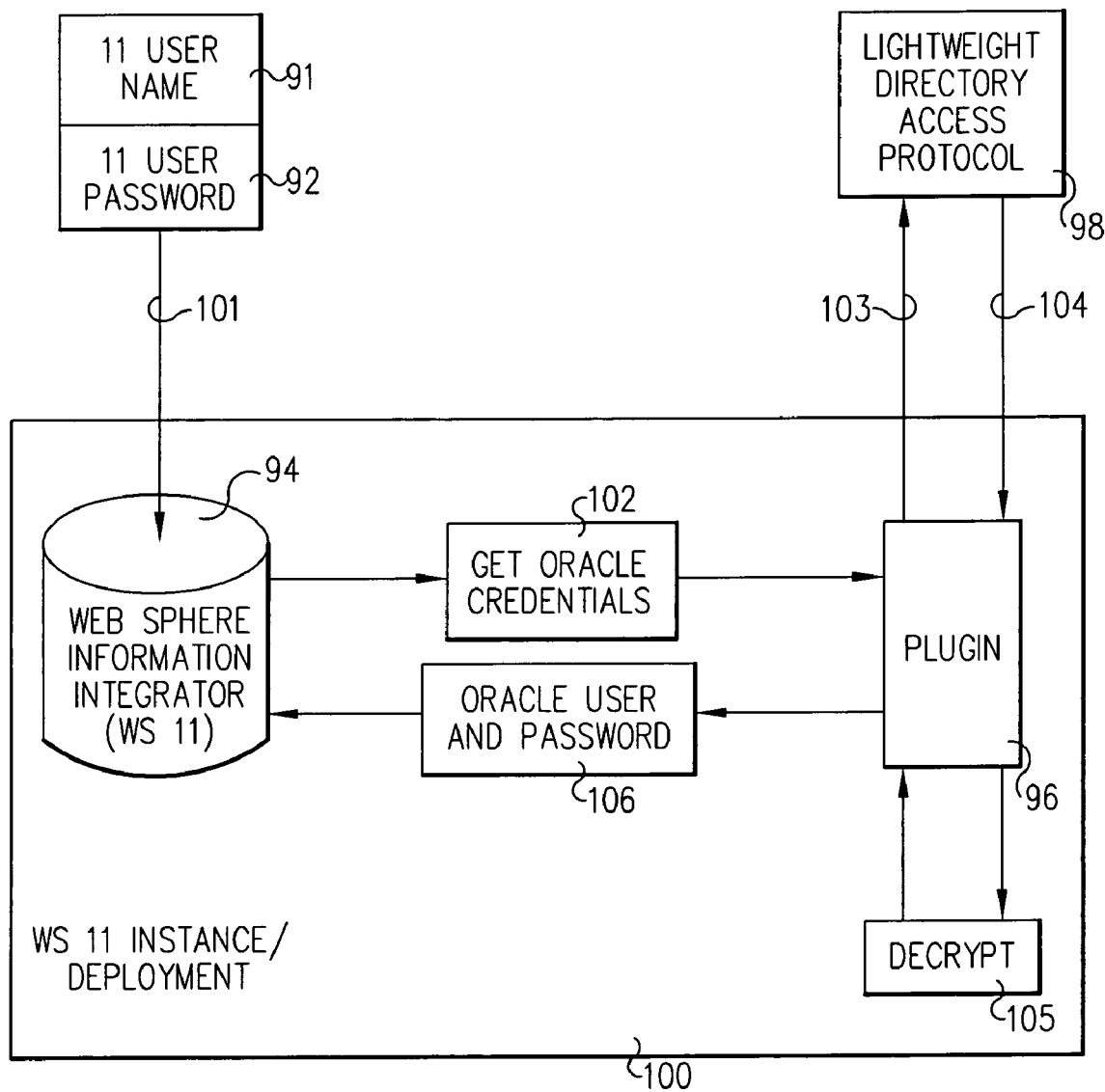
FIG. 1 is a high level system diagram illustrating a WS II instance or deployment.

Referring to FIG. 1, as represented by line 101, a WS II 94 user name 91 (John) and password 92 (ii_pwd) are written to WS II 94. Next, WS II 94 issues a function call 'get oracle credentials' 102 to Plugin 96. Plugin 96 issues a remote network call 103 to Lightweight Directory Access Protocol (LDAP) 98 to access data. Data in the LDAP server is not stored as a table, but as a tree such as organization→person→user_mapping, where user_mapping looks like an entry in the following Table 1:

TABLE 1

EXAMPLE LDAP TABLE

| Server | AuthID | UserName | Encrypted Password |
|---|---|---|---|
| Oracle1 | John | Scott | ~D<<AV,6 |
| Sybase1 | John | Johnnie | ~D<<76,AV |

LDAP 98 returns remote network call 104 with Oracle User: Scott and Oracle password: ~D<<AV,6 to Plugin 96. Plugin 96 decrypts 105 Encrypted Oracle password ~D<<AV,6 to obtain Oracle password: tiger, which it returns in function call 106 to WS II 94.

WS II deployments 100 typically integrate all the data sources of the customer and therefore require extremely high levels of security. So, WS II 94 needs to completely trust any software module 96 that interacts with it. For example, a rogue Plugin 96 might return invalid passwords back to WS II 94 and cause the user to get locked out of all systems. Moreover, if Plugin 96 is trusted and runs within WS II's context 100, it can cause even more damage such as memory leaks, shared memory corruption, and so forth.

Therefore, WS II 94 needs to completely trust any Plugin 96 or third party component before interacting with it.

In accordance with the preferred embodiments of the generates a public-private key-pair unique to its own deployment 100. The customer then keeps its unique secret-key securely in its own deployment. As will be described hereafter in connection with FIG. 3, the public-key is sent by the customer to obtain a digital certificate from a well-known Certification Authority (CA). The certificate affirms the identity of the customer and is digitally signed by the CA. The CA can be either the customer itself (self-signed certificates) or any trusted CA such as IBM, Verisign and CA Cert.

In order to achieve mutual-trust, both Plugin 96 and WS II 94 trust the well-known certification authority (CA). That is, for example, if the CA verifies that the certificate is valid, then plugin 96 can trust that it is. A certificate shows that a public key stored in the certificate belongs to the subject of that certificate. A certification authority is responsible for verifying the identity of a requesting entity before issuing a certificate. The CA then signs the certificate using its private key, which is used to verify the certificate.

As will be more fully described hereafter, when the customer, such as a WS II 94 customer, interacts with, for example, a Plugin 96, it first presents its certificate to prove its identity. The Plugin verifies that the certificate is indeed valid and the customer is who it claims to be. Then, the Plugin sends sensitive information to the customer, encrypting it in the customer's public-key. Since the customer's private-key is securely kept in its own deployment, there is no way in which the secure information can be decrypted and used by any entity other than the customer.

Two-way, or mutual, trust is assured, as follows. Just like the plugin 96 verifies the identity of WS II, the WS II in turn also verifies the identity of plugin 96. All communication is encrypted in each other's public keys, so both verify the other's identity and both sides of the communication are protected.

In the present invention, communication between the Plugin and the WS II occurs at the application layer 110, 112 of a protocol stack.

Figure 2:
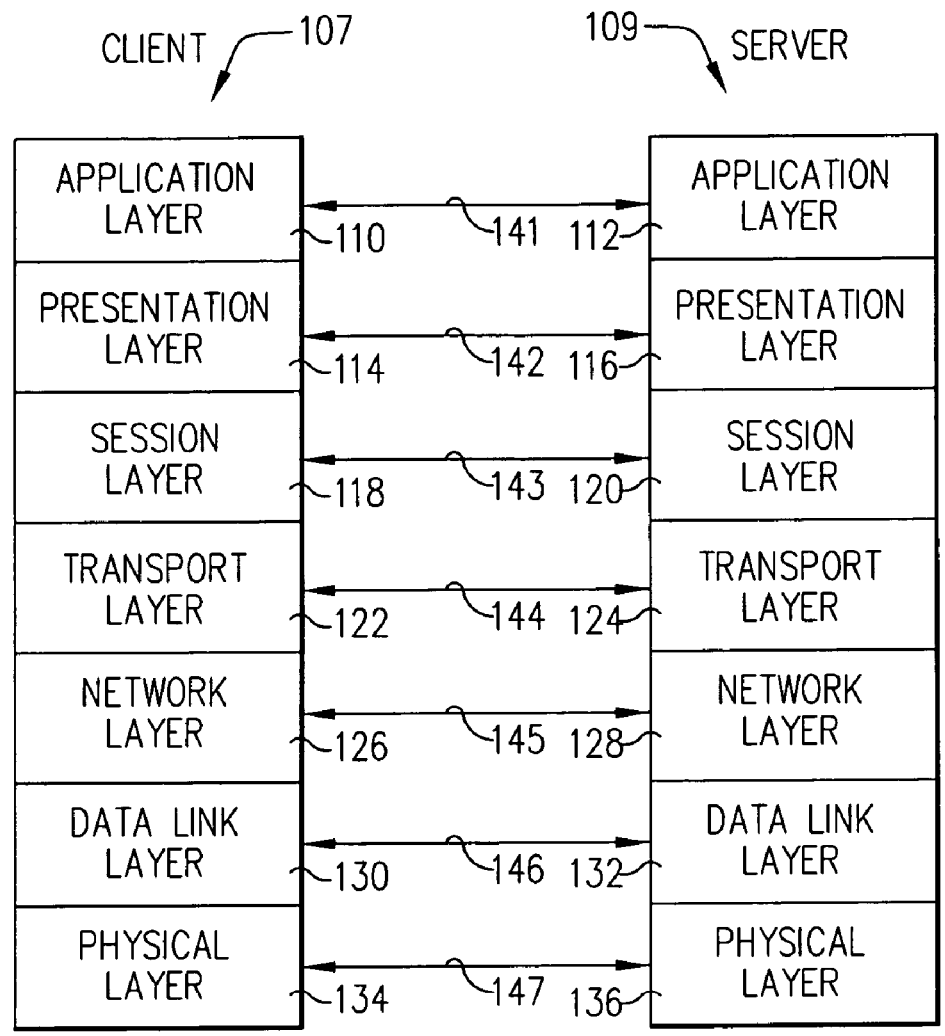
FIG. 2 is schematic representation of the Open Systems Interconnection (OSI) protocol stack of the prior art.

Referring to FIG. 2, the Open Systems Interconnection (OSI) architecture is an example of a protocol stack which includes a plurality of functional layers, including application 110, 112, presentation 114, 116, session 118, 120, transport 122, 124, network 126, 128, data link 130, 132, and physical 134, 136 layers. Other protocol stacks may combine or separate functions in a different configuration of layers. However, it is a characteristic of such protocol stacks that communication occurs between corresponding layers in both system nodes involved, such as between a server node 107 and a client node 109, as is represented by lines 141-147, respectively.

Figure 3:
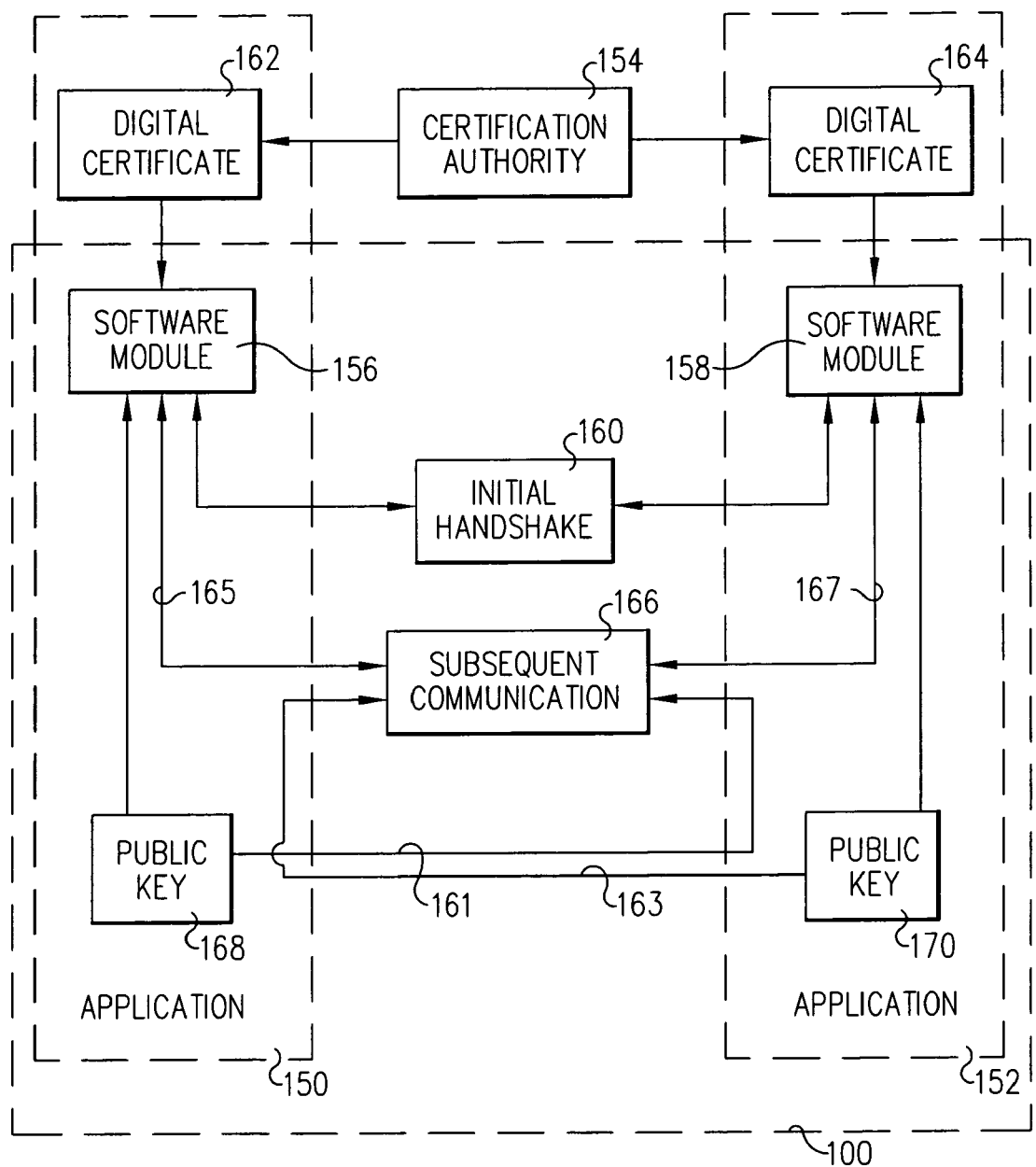
FIG. 3 is a schematic representation of the preferred embodiment of the invention.

Referring to FIG. 3, in accordance with the present invention, mutual trust is established by beginning all conversations between software modules 156, 158 (such as WS II 94 and Plugin 96) with an initial handshake 160 wherein both parties 156, 158 identify themselves and establish trust by exchanging digital certificates 162, 164 received from some trusted certification authority 154 and their respective public keys 168, 170, before further communicating.

All subsequent communications 116 between parties 156, 158 are also encrypted with each other's public keys 168, 170, respectively, as is represented by lines 161, 165 and 163, 167, so only the intended recipient can decode the information exchanges 166 between the two entities 156, 158.

The present invention provides establishing mutual trust between software modules 156, 158 on the same machine or on different machines. Therefore, the communication may or may not involve any network. Two software modules 156, 158 on the same server may talk to each other through remote procedure calls or inter process communication or other mechanisms not involving any network. Therefore, the present invention uses handshake 160 which occurs at an application layer between two communicating software entities 156, 158.

Figure 4:
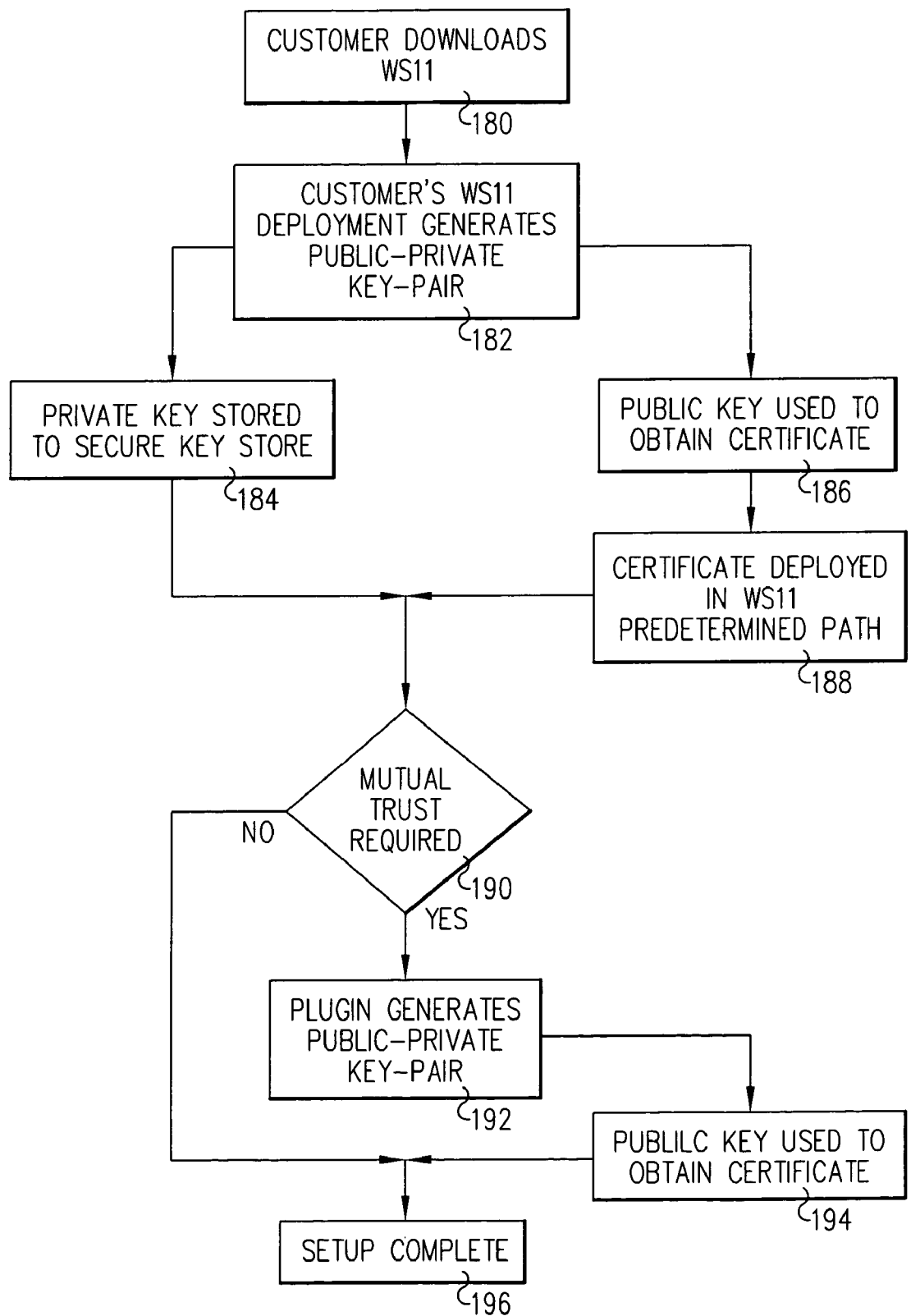
FIG. 4 is a flow chart representation of the setup process for the preferred embodiment of the invention.
Figure 6:
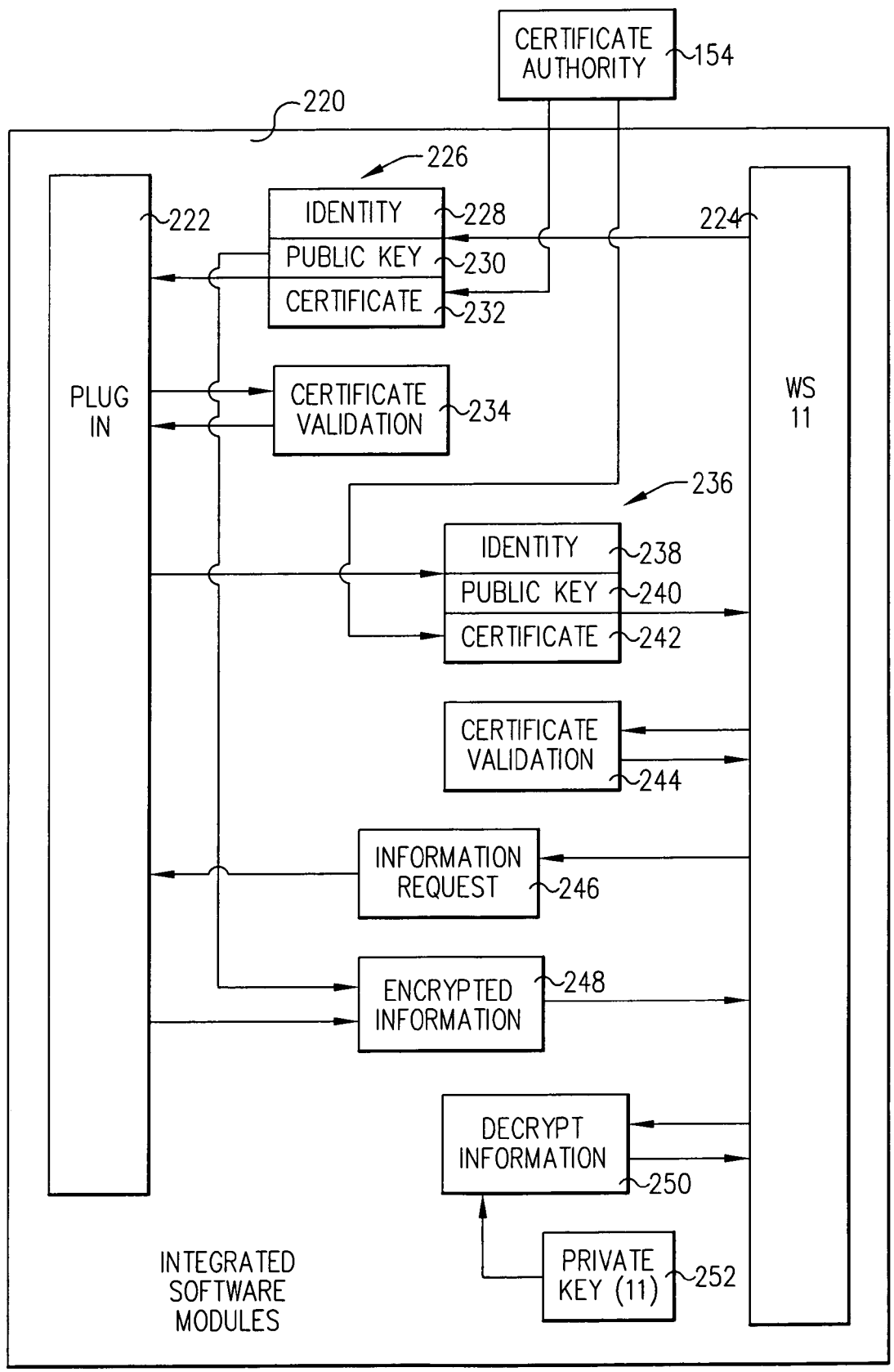
FIG. 6 is a diagrammatic representation of the programming methods and structures of the exemplary embodiment of FIG. 5.

Referring to FIG. 4 in connection with FIG. 6, an exemplary embodiment of the setup process of the invention begins in step 180 with a customer downloading WS II 224.

In step 182, customer WS II 224 generates a public-private key-pair 230, 252. In step 184 private key 252 is kept in a secure keystore known only to customer.

In step 186, public key 230 is used to obtain a certificate 232 from a trusted certificate authority (CA) 254. Certificate 232 guarantees that customer WS II 224 is indeed what it claims to be. This provides proof of identity of the originator and ensures non-repudiation.

In step 188, certificate 230 is deployed in a predetermined path in WS II 224. That is, the key is stored somewhere with the WS II deployment at a location where access is very limited—for example, at a location where only a super-user or super-administrator has access privileges.

In step 190, it is determined if mutual trust is required because Plugin 222 also needs to be validated by the WS II deployment, and if so, in step 192 Plugin 222 also generates a public 240/private key-pair and in step 194 obtains certificate 242 from certificate authority (CA) 154 for use by WS II 224 in verifying its (Plugin 222) identity.

Figure 5:
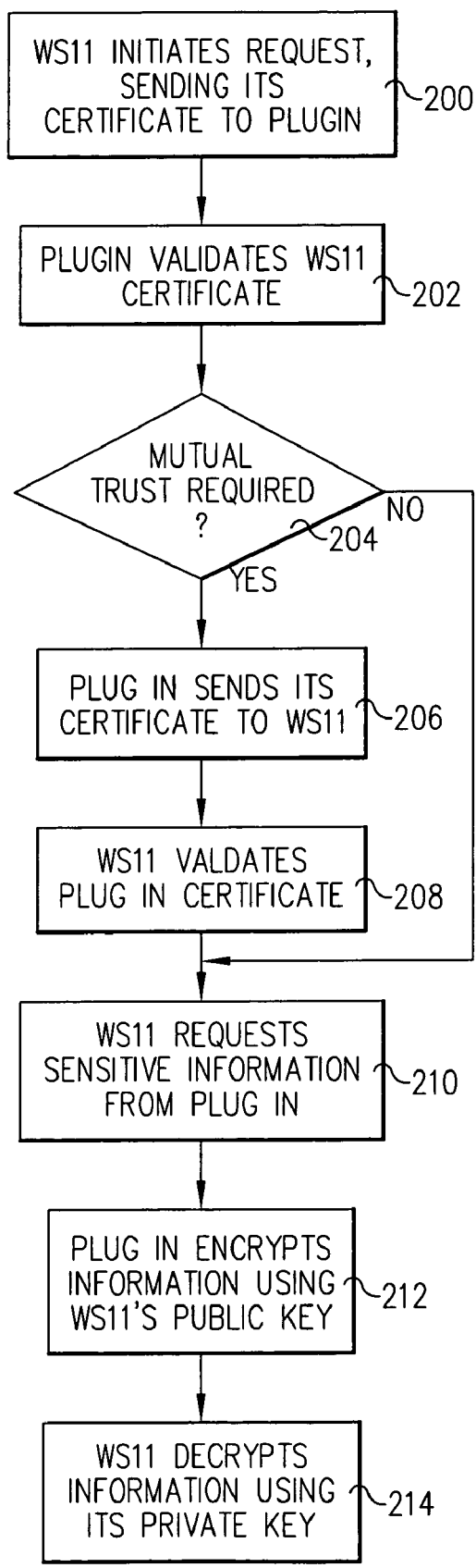
FIG. 5 is a flow chart representation of the interaction between WS II and Plugin in accordance with an exemplary embodiment of the invention.

Referring to FIG. 5 in connection with FIG. 6, subsequent to setup process (FIG. 4), in step 200 WS II 224 initiates a request 226 by sending its certificate 232 to prove its identity 228.

In step 202, Plugin 222 validates 234 certificate 232 to ensure that it is indeed interacting with the customer's WS II 224.

In steps 204, 206, in case WS II 224 also needs to trust Plugin 222, Plugin 222 responds by sending its response 236 including its own certificate 242. In step 208, WS II validates certificate 242 with respect to identity 238 to verify the trustworthiness of Plugin 222.

Parties 222 and 224 have now established mutual trust, and handshaking is complete. They can now interact.

In step 210, WS II 224 issues request 246 for some sensitive information from Plugin 222.

In step 212, Plugin 222 sends the sensitive reply 248 encrypted in WS II's public key 230. In step 214, WS II 224 decrypts (250) the sensitive information using its private key 252.

Public key cryptography is a form of cryptography that uses a pair of mathematically related cryptographic keys, designated as public key and private key, to enable users to communicate securely without having prior access to a shared secret key.

In public key cryptography, the private key is kept secret, while the public key may be widely distributed. Due to the aforementioned mathematical relationship, the public and private keys are related in such a way that any message encrypted with the public key can only be decrypted by the corresponding private key. In simple terms, one key "locks" a lock; which the other is required to unlock it.

Also, despite the mathematical relationship between the public and private keys, it is computationally infeasible to deduce the private key from the public key.

As a result of processing described above, there is provided a two-way (as opposed to a one-way) trust between software components 156, 158. The trust mechanisms apply to each individual deployment or instance 100 of a software product (as distinguished from the software product itself, and thus differing from signed jars and signed mobile code which cannot distinguish individual deployments). The mutual trust mechanisms do not rely on transport level 122, 124 security such as SSL/https. Security is incorporated at the application level 110, 112 into the basic communication 141 protocol between software modules 156, 158.

Unlike other solutions for establishing trust, the present invention is secure against compromising of the secret-key (which remains truly secret) and is also robust against certificate theft.

The architecture of the preferred and exemplary embodiments described previously for establishing mutual trust and secure interaction is general enough to be applied to any pluggable architecture. Any setup that includes an autonomous entity interacting with a third-party software module or Plugin can use the present invention to establish mutual trust.

The process flow of the preferred and exemplary embodiments described previously for establishing mutual trust and secure interaction can be used for certifying a "good" or trustworthy Plugin. WS II interacts with various software modules, such as user defined functions (UDFs), 3rd party wrappers, stored-procedures, Plugins, and so forth. There is presently no standardized process in place to ascertain that WS II is indeed interacting with a trustworthy component. The burden of ensuring safety of the software modules has previously been placed on the system administrator or database administrator. Although a federated server can run in a "fenced mode" and avoid being crashed by a malicious Plugin or component, there is no protection against malicious Plugins or modules using up too much memory or causing other resource-errors in the system. The present invention can be used to standardize the process for obtaining identities and establishing trust between components, thereby eliminating the need for implicit trust on the administrators.

Advantages Over the Prior Art

It is an advantage of the present invention that there is provided a system and method for establishing mutual trust between software components with each deployment (that is, on a per-deployment basis).

Alternative Embodiments

It will be appreciated that, although specific embodiments of the invention have been described herein for purposes of illustration, various modifications may be made without departing from the spirit and scope of the invention.

While the invention has been described primarily with respect to the WS II identity mapping plugin architecture, it may be applied to any kind of pluggable architecture. Also, a plugin is not limited to work just with LDAP. It can be used with any repository, and thus the invention is directed to the more general problem of mutual trust between two software modules.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 7:
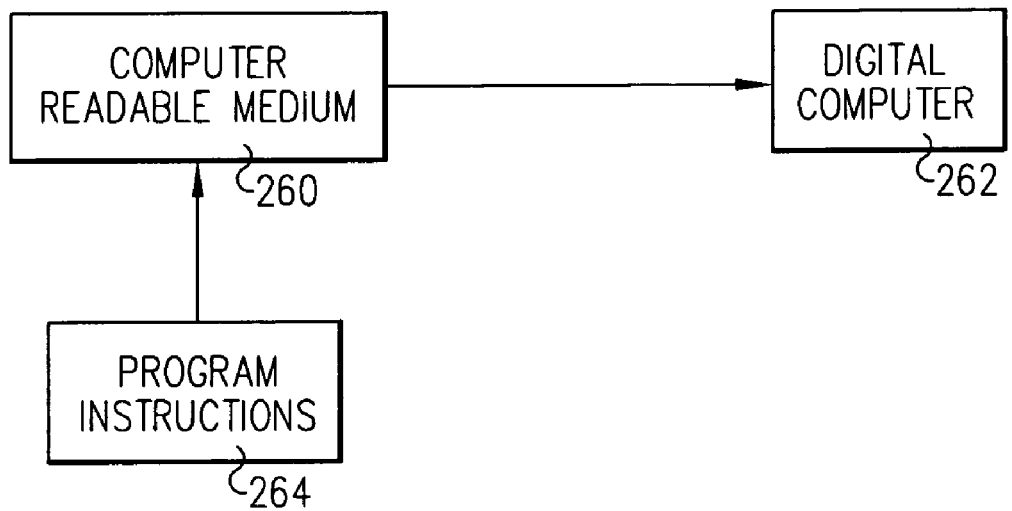
FIG. 7 is a high level system diagram illustrating a computer program product in accordance with the preferred embodiment of the invention.

Referring to FIG. 7, the invention can take the form of a computer program product accessible from a computer-usable or computer-readable medium 260 providing program code 264 for use by or in connection with a computer or any instruction execution system 262. For the purposes of this description, a computer-usable or computer-readable medium 260 can be any apparatus that can contain, store, communicate, propagate, or transport the program for use by or in connection with the instruction execution, system, apparatus, or device 262.

The medium 260 can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 262 coupled directly or indirectly to memory elements through a system bus. The memory elements can include local memory employed during actual execution of the program code, bulk storage, and cache memories which provide temporary storage of at least some program code 264 in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A computer implemented method for establishing mutual trust on a per-deployment basis between a first and second software modules implemented in at least one data processing system, comprising:
   executing, by at least one processing device, for a deployment an initial handshake between the first and second software modules wherein the first and second software modules identify themselves, wherein the second software module interacts with the first software module as part of the deployment, and wherein the second software module provides the first software module access to a password protected service and returns sensitive information from the service to the first software module;
   exchanging digital certificates between the first and second software modules, wherein the first and second software modules receive their digital certificates and respective public keys from at least one of a plurality of trusted certification authorities trusted by the first and second software modules, wherein the exchanging of the digital certificates establishes mutual trust between the first and second software modules for each deployment; and
   executing, by the at least one processing device, subsequent communications for the deployment between the first and second software modules with each of the first and second software modules encrypting their communications with the public key of the other of the first and second software modules in response to the exchanging of the digital certificates and the respective public keys, and wherein the second software module encrypts the sensitive information returned from the service with the public key of the first software module to return to the first software module.

2. The method of claim 1, said mutual trust being established between software modules on a same machine.

3. The method of claim 1, said mutual trust being established between software modules on different machines though application layer communications.

4. The method of claim 1, further comprising:
   initializing said deployment, including
   said first software module,
      generating a first key-pair including a first public key and a first private key;
      storing said first private key to secure key store; and
      obtaining a first certificate from a trusted certification authority using said first public key; and
   said second software module,
      generating a second key-pair including a second public key and a second private key; and
      obtaining a second certificate from said trusted certification authority using said second public key.

5. The method of claim 4, further comprising:
   thereafter throughout said deployment, executing communications between said first and second software modules, including
      said first software module initiating a request including said first certificate for a communication session to said second software module;
      said second software module validating said first certificate and sending a response including said second certificate to said first software module;
      said first software module validating said second certificate and requesting sensitive information from said second software module;
      said second software module sending said sensitive information encrypted with said first public key as encrypted information to said first software module; and
      said first software module decrypting said encrypted information using said first private key.

6. The method of claim 5, said communications between said first and second software modules further including:
   said second software module requesting further sensitive information from said first software module;
   said first software module sending said further sensitive information encrypted with said second public key as further encrypted information to said second software module; and
   said second software module decrypting said encrypted information using said second private key;
   said executing communications being repeated for each request for sensitive information.

7. The method of claim 5, said first software module being a Websphere (WS) Information Integrator (II) deployment, and said second software module being a plugin.

8. The method of claim 1, wherein the second software module comprises a plugin with which the first software module interacts and runs in the context of the first software module.

9. The method of claim 1, wherein the service comprises a server having data, and wherein the second software module obtains from the server a password required to access the server and the data in the server, wherein the sensitive information comprises the password the second software module provides to the first software module to use to access the server.

10. A system for establishing mutual trust on a per-deployment basis between two software modules, comprising:
    at least one data processing system;
    at least one storage medium;
    a first software module in the at least one storage medium;
    a second software module in the at least one storage medium;
    a communication link for connecting said first and second software modules;
    wherein the at least one data processing system executes the first and second software modules to perform operations, the operations comprising:
        executing for a deployment an initial handshake over said communication link wherein the first and second software module identify themselves, wherein the second software module interacts with the first software module as part of the deployment, and wherein the second software module provides the first software module access to a password protected service and returns sensitive information from the service to the first software module;
        exchanging digital certificates between the first and second software modules, wherein the first and second software modules receive their digital certificates and respective public keys from at least one of a plurality of trusted certification authorities trusted by the first and second software modules, wherein the exchanging of the digital certificates establishes mutual trust between the first and second software modules for each deployment; and
        said first and second software modules executing subsequent communications over said communication link for the deployment with each of the first and second software modules encrypting their communications with the public key of the other of the first and second software modules in response to the exchanging of the digital certificates and the respective public keys, and wherein the second software module encrypts the sensitive information returned from the service with the public key of the first software module to return to the first software module.

11. The system of claim 10, said mutual trust being established between software modules on a same machine.

12. The system of claim 10, said communication link being a communications path at an application layer and said mutual trust being established between software modules on different machines communicating at said application layer.

13. The system of claim 10, further comprising:
    said first software module initiating set up of said deployment by
        generating a first key-pair including a first public key and a first private key;
        storing said first private key to secure key store; and
        obtaining a first certificate from a trusted certification authority using said first public key; and
    said second software module completing said set up by,
        generating a second key-pair including a second public key and a second private key; and
        obtaining a second certificate from said trusted certification authority using said second public key.

14. The system of claim 13, further comprising:
    said first and second software modules conducting throughout said deployment communications between said first and second software modules, including
    said first software module initiating a request including said first certificate for a communication session to said second software module;
    said second software module validating said first certificate and sending a response including said second certificate to said first software module;
    said first software module validating said second certificate and requesting sensitive information from said second software module;
    said second software module sending said sensitive information encrypted with said first public key as encrypted information to said first software module; and
    said first software module decrypting said encrypted information using said first private key.

15. The system of claim 14, said executing communications being repeated for each request for sensitive information.

16. The system of claim 14, said first software module being a Websphere (WS) Information Integrator (II) deployment, and said second software module being a plugin.

17. The system of claim 10, wherein the second software module comprises a plugin with which the first software module interacts and runs in the context of the first software module.

18. The system of claim 10, wherein the service comprises a server having data, and wherein the second software module obtains from the server a password required to access the server and the data in the server, wherein the sensitive information comprises the password the second software module provides to the first software module to use to access the server.

19. A computer program product embedded in a computer readable storage medium having instructions executed for establishing mutual trust on a per-deployment basis between a first and second software modules, wherein the computer readable storage medium is a member of a set of computer readable storage medium consisting of a semiconductor or solid state memory, magnetic tape, a removable computer diskette, a random access memory (RAM), a read-only memory (ROM), a rigid magnetic disk, and an optical disk, said computer program product comprising:
    first program instructions for executing for a deployment an initial handshake between the first and second software modules wherein the first and second modules identify themselves, wherein the second software module interacts with the first software module as part of the deployment, and wherein the second software module provides the first software module access to a password protected service and returns sensitive information from the service to the first software module;
    exchanging digital certificates between the first and second software modules, wherein the first and second software modules receive their digital certificates and respective public keys from a at least one of a plurality of trusted certification authorities trusted by the first and second software modules, wherein the exchanging of the digital certificates establishes mutual trust between the first and second software modules for each deployment; and
    second program instructions for executing subsequent communications for the deployment between the first and second software modules with each of the first and second software modules encrypting their communications with the public key of the other of the first and second software modules in response to the exchanging of the digital certificates and the respective public keys, and wherein the second software module encrypts the sensitive information returned from the service with the public key of the first software module to return to the first software module.

20. The computer program product of claim 19, said mutual trust being established between software modules on a same machine.

21. The computer program product of claim 19, said mutual trust being established between software modules on different machines though application layer communications.

22. The computer program product of claim 19, said first program instructions further for:
  initializing said deployment, including
    said first software module,
      generating a first key-pair including a first public key and a first private key;
      storing said first private key to secure key store; and
      obtaining a first certificate from a trusted certification authority using said first public key; and
    said second software module,
      generating a second key-pair including a second public key and a second private key; and
      obtaining a second certificate from said trusted certification authority using said second public key.

23. The computer program product of claim 22, said second program instructions further for:
  thereafter throughout said deployment, executing communications between said first and second software modules, including
    said first software module initiating a request including said first certificate for a communication session to said second software module;
    said second software module validating said first certificate and sending a response including said second certificate to said first software module;
    said first software module validating said second certificate and requesting sensitive information from said second software module;
    said second software module sending said sensitive information encrypted with said first public key as encrypted information to said first software module; and
    said first software module decrypting said encrypted information using said first private key.

24. The computer program product of claim 23, said executing communications being repeated for each request for sensitive information, and said first software module being a Websphere (WS) Information Integrator (II) deployment, and said second software module being a plugin.

25. The computer program product of claim 19, wherein the second software module comprises a plugin with which the first software module interacts and runs in the context of the first software module.

26. The computer program product of claim 19, wherein the service comprises a server having data, and wherein the second software module obtains from the server a password required to access the server and the data in the server, wherein the sensitive information comprises the password the second software module provides to the first software module to use to access the server.

* * * * *